Patented Nov. 4, 1941

2,261,642

UNITED STATES PATENT OFFICE 2,261,642

NITROSTARCH COMPOSITION

Walter D. Bowlby, Allentown, Pa., assignor to Trojan Powder Company, Allentown, Pa.

No Drawing. Application September 28, 1938, Serial No. 232,158

5 Claims. (Cl. 106—211)

This invention relates to improvements in nitrostarch compositions and, more particularly, to coating compositions intermediate between paints and lacquers.

An object of the invention is to provide blown drying oil coating compositions which dry more rapidly than paint and produce hard and tough films. Other objects and advantages of the invention will appear from the detailed description that follows.

I have discovered that blown drying oils, such as linseed, corn, soya bean, perilla and like oils, possess the property of compatibility with nitrostarch, whereas the same oils unblown are not compatible and, therefore, separate from nitrostarch in a film consisting largely of the two ingredients. I have discovered also that these blown drying oils when dissolved with a critical proportion of nitrostarch in a suitable volatile solvent medium give coating compositions adapted to produce films that dry rapidly and are notably strong and durable.

As an example of my invention, I may dissolve about 55 parts of nitrostarch containing 11% to 13.5% nitrogen and about 45 parts of the blown oil in a volatile solvent medium of type ordinarily used in pyroxylin lacquers but, preferably, somewhat richer in active solvent ingredients.

The following is an example of a solvent medium that may be used.

| | Per cent |
|---|---|
| Ethyl acetate | 10 |
| Butyl acetate | 25 |
| Butyl ether of ethylene glycol | 5 |
| Butyl alcohol | 10 |
| Toluene | 30 |
| Xylene | 5 |
| Petroleum naphtha (lacquer diluent grade) | 15 |
| Total | 100 |

Proportions are expressed above and elsewhere herein as parts or percentages by weight.

An example of a lacquer made in accordance with my present invention is the following:

| | Per cent |
|---|---|
| Solvent medium | 50 |
| Blown perilla oil | 20 |
| Nitrostarch | 26 |
| Dibutyl phthalate | 4 |
| Total | 100 |

My improved lacquers, on evaporation of the volatile solvent, leave films containing nitrostarch fully compatible with the blown oil. For example, there is no separation of the nitrostarch and blown perilla oil in the films. On the other hand, there is segregation of the nitrostarch and oil in films when the oil is raw or unblown.

The film-forming ingredients may consist largely of the nitrostarch and blown oil, say, to the extent of 80% or more. On the other hand, the lacquer may contain conventional lacquer admixtures as well as a drier for the oil present.

The hardening of the film left on evaporation of the solvent medium may be hastened by heating the film in the presence of air, as for example, to a temperature of 70° to 120° C.

The lacquer may contain various concentrations of film-forming ingredients, say, 15 to 70 parts by weight to 100 parts of the solution. In fact, I may spray the composition at very high concentrations of the non-volatile ingredients, as, for instance, at a concentration of 30 to 50 parts thereof to 100 parts of the lacquer.

The proportions of the several film-forming ingredients may be varied with respect to each other. For fast air-drying lacquers, there may be used 40 to 65 parts by weight of nitrostarch, 35 to 60 parts of the blown oil, and 0 to 15 parts of plasticizer for 100 parts total weight of the said ingredients. In general, a high proportion of nitrostarch, within the above range, is used to make the film relatively hard and tough after application of lacquer and removal of volatile solvents. In no case, however, should the proportion of nitrostarch exceed 65% of the combined weight of nitrostarch and blown oil, unless a strength-imparting resin is also present, as will hereinafter appear.

Less nitrostarch than 40 parts to 60 parts of oil may be used for slow air-drying coatings, as brushing finishes or when drying is accelerated by heating. Even as little as 10 parts of nitrostarch to 90 parts of blown oil reduces the time required for setting of the oil.

A preferred lacquer contains 50 to 60 parts of nitrostarch to 100 parts of nitrostarch and blown oil. With such a formula, I have obtained lacquer films of tensile strength as high as 200 to 300 kilograms to the square centimeter of cross section whereas films comparably made but omitting either the nitrostarch or blown oil are extremely weak.

In determining the tensile strength referred to, the following method is used. There is poured on a level glass plate, within an adhered frame with central portion cut out over an area 6 by 6 inches, 20 cc. lacquer of 15% content of solids (non-volatile), adequate to form within the cut out portion of the frame a final lacquer film approximately 0.0035 inch thick. The poured lacquer is allowed to dry for six to eight hours at room temperature and then is warmed for 15 hours at 85° C. The dried film is cut, while still adhered to the plate, into test strips each 1 by 3.5 inches. The glass plate and cut film are immersed in warm water for a few hours, to loosen the film. The test strips are then removed from the glass and allowed to age in air for 3 days. Finally they are tested for breaking strength in a Scott tensile strength testing machine, the test strips being calipered and the tensile strength calculated as kg. per square cm. of cross section of the film tested.

The blown drying oil selected should preferably be one that does not polymerize substantially when a lacquer containing the oil, nitrostarch, and solvent is allowed to stand. Examples of such blown oils that may be used, in addition to those given above, are hempseed, sunflower seed, and menhaden oil. Blown tung oil, on the other hand, tends to polymerize when used in nitrostarch lacquer and thus to form a gelled layer on the surface of the lacquer on standing and under certain conditions, as, for example, in mixtures with zinc stearate in nitrostarch lacquer, causes complete gelling of the lacquer.

The term "substantially non-polymerizing" is used herein to describe an oil, that in a lacquer solution, say in a closed can or pail, does not cause gelling of the solution or forming of a gelled surface layer thereon.

The term "drying oil" is used herein to include only fatty oils having, before being blown, an iodine value in excess of 90.

The blown oils that are preferred are produced by blowing air or oxygen through a heated drying oil, to effect therein a substantial modification as shown by thickening of the oil and markedly decreased iodine absorption capacity (iodine value, Wijs) such as a reduction of about 30% of the original iodine value. I use blown oils with iodine values in excess of 50 and preferably about 100 or more. The blown oils used should be oxygen-convertible, that is, hardenable by further oxidation to a substantial extent, and preferably to non-tacky condition, on exposure to air.

My new compositions show the characteristics of both paints and lacquers, the blown drying oil tending to form a film by oxidation and the nitrostarch giving to this film increased body, hardness and toughness, and quick drying.

I prefer to employ a plasticizer, such as dibutyl phthalate, tricresyl phosphate or methyl acetyl ricinoleate, when the amount of nitrostarch is approximately 50 to 65% of the weight of nitrostarch, plasticizer, and blown oil. Thus I may use plasticizer to the extent of 0 to 5% by weight of the lacquer. For proper durability, the blown oil should constitute at least a third of the film-forming ingredients, this term excluding pigments and other inert materials that may be present.

Lacquers of the kind described are desirable as topcoats and as the base for sealers and sanding primer coats. For this latter purpose there is added to the lacquer a filler, such as one which increases the filling properties of the lacquer film and facilitates sanding after the film has hardened. For instance, there may be added powdered material such as zinc stearate, soapstone, ferric oxide and/or magnesium carbonate. In all cases the filler material added should be one that is dispersible in the lacquer and is stable under conditions of use. Preferably the filler includes a large proportion of zinc stearate or the like. Thus, a suitable filler is one containing 6 parts of zinc stearate, 2 of soapstone, and 2 of magnesium carbonate. A satisfactory proportion of the filler is about 5 to 15 parts to 100 parts of the hardened film, although for some purposes other proportions of the filler may be used.

One disadvantage of lacquers containing pyroxylin and blown drying oil is the lifting or distortion effect upon a previously applied and dried lacquer film. This disadvantage is minimized when my nitrostarch and blown drying oil compositions are used, the need of a second coat being usually obviated.

Although films from blown oils by themselves have no appreciable strength, I have discovered that as nitrostarch is added to blown oils the films formed from such mixtures increase in strength and that the strength finally reaches a maximum at about 55 to 60% nitrostarch in the mixture. Further increase in the proportion of nitrostarch causes the strength of the films to fall off abruptly and to reach zero strength (i. e., a strength too low to register properly on the testing machine), at the proportion of 2 parts nitrostarch to 1 part oil. For this reason it is undesirable in my mixtures to use more nitrostarch than the maximum strength proportion, and it is preferred to use less nitrostarch, such as about equal parts of nitrostarch and blown oil. The degree of strength of the maximum strength mixture varies more or less directly with the iodine value of the blown oil used; it ranges from 50 kilograms per square centimeter to about 350 kilograms.

The critical nature of the proportion of nitrostarch to the combined weight of nitrostarch and blown oil is illustrated by the following data. This data shows the tensile strength, determined as described above, for films of varying proportions of nitrostarch with a blown oil of medium iodine value (soya bean) and one of rather high value (perilla).

| Nitrostarch, percent of combined weight of nitrostarch and blown oil | Breaking strength, kg. per sq. cm. | |
| --- | --- | --- |
| | Blown soya bean oil | Blown perilla oil |
| 0 | 0 | 0 |
| 10 | 0 | 15 |
| 20 | 0 | 50 |
| 30 | 5 | 100 |
| 40 | 15 | 150 |
| 50 | 50 | 200 |
| 55 | 80 | |
| 57 | ------ | 240 |
| 60 | 25 | 80 |
| 70 | 0 | 0 |

I have found that nitrostarch and blown oil compositions may have a part of the nitrostarch and blown oil substituted by oxygen-convertible alkyd resins, heat-hardenable urea formaldehyde resins, or other strength-imparting resinous materials of lesser softening effect upon nitrostarch than shown by blown oils. In such compositions, the proportion of nitrostarch should not exceed 60% nor be less than 10% of the combined weight of nitrostarch, blown drying oil, and resin. Thus, there may be used about equal parts of nitrostarch, blown oil, and strength-imparting resins. An example of such a composition is the following:

| | Per cent |
|---|---|
| Nitrostarch | 17 |
| Ester of pentaerythritol with phthalic anhydride and linseed oil acids (short oil-length) | 17 |
| Blown perilla oil | 17 |
| Pigment | 4 |
| Solvent | 45 |
| Total | 100 |

For some purposes, especially when there is desired a lacquer of relatively high viscosity for a given concentration of film-forming ingredients, there may be used a semi-solid oil with drying properties, to replace all or part of the blown oils described. An example is a product made by first dehydrating an originally non-drying hydroxy fatty oil, as for example, castor oil or the glycerol esters of a hydroxy oleic acid, dihydroxy stearic acid, or the like, to give a drying oil, and then blowing the dehydrated oil to consistency desired. Thus, I have used such an oil of the consistency of a soft plastic. Baker's 781 oil may be used. The semi-solid oils, like the blown oils, add strength to a nitrostarch film, and with them also there are critical proportions of nitrostarch, similar to those described above, for maximum strength of films.

Compositions of the kind herein described are useful not only in lacquers but also in overprint varnishes, inks, artificial leather, and the like.

The term "blown oil" is used herein to include mixtures of blown oils of the kinds described.

It will be understood that the details given are for illustration not restriction, and that variations within the spirit of the invention are intended to be included in the scope of the appended claims.

I claim:

1. A lacquer comprising nitrostarch, a substantially non-polymerizing blown drying oil, and a volatile solvent medium, the proportion of nitrostarch being 10 to 60% of the combined weight of nitrostarch and blown oil.

2. A lacquer as described in claim 1, the iodine value of the blown oil being above 50.

3. A lacquer comprising nitrostarch, a blown drying oil, a strength-imparting resin, and a volatile solvent medium, the proportion of nitrostarch being not in excess of 60% and not less than 10% of the combined weight of nitrostarch, blown oil, and resin.

4. A lacquer comprising a volatile solvent medium and film-forming ingredients, the film-forming ingredients comprising nitrostarch and the product of dehydrating and then blowing a hydroxy fatty oil, and the proportion of nitrostarch being 10 to 60% of the combined weight of the nitrostarch and oil.

5. A lacquer comprising nitrostarch, a substantially non-polymerizing blown drying oil, and a volatile solvent medium, the proportion of nitrostarch being about 40 to 60% of the combined weight of nitrostarch and blown oil.

WALTER D. BOWLBY.